United States Patent

Levine

Patent Number: 4,703,442
Date of Patent: Oct. 27, 1987

[54] TEMPERATURE TRACKING DEFECT CORRECTOR FOR A SOLID-STATE IMAGER

[75] Inventor: Peter A. Levine, Mercer County, N.J.

[73] Assignee: RCA Corporation, Princeton, N.J.

[21] Appl. No.: 779,861

[22] Filed: Sep. 25, 1985

[51] Int. Cl.[4] .............................................. H04N 5/14
[52] U.S. Cl. .................................... 364/521; 358/163; 358/220; 364/557
[58] Field of Search ............... 364/557, 518, 521, 571; 358/163, 164, 220, 221

[56] References Cited

U.S. PATENT DOCUMENTS

| 3,856,989 | 12/1974 | Weimer | 178/7.1 |
| 4,200,934 | 4/1980 | Hofmann | 364/571 |
| 4,285,004 | 8/1981 | Morrison et al. | 358/164 X |
| 4,520,395 | 5/1985 | Abe | 358/163 |
| 4,535,359 | 8/1985 | Fearnside | 358/163 |
| 4,590,520 | 5/1986 | Frame et al. | 358/163 |

Primary Examiner—Gary V. Harkcom
Assistant Examiner—H. R. Herndon
Attorney, Agent, or Firm—Eugene M. Whitacre; Peter M. Emanuel; James B. Hayes

[57] ABSTRACT

A defect corrector for a solid-state imager in which temperature tracking defect correction signals associated with the defective pixels are generated. The temperature tracking defect correction signals are combined with photoresponse signals from the corresponding defective pixels to provide defect compensation for the photoresponse signal developed from each of the defective pixels.

7 Claims, 4 Drawing Figures

TEMPERATURE TRACKING DEFECT CORRECTOR FOR A SOLID-STATE IMAGER

FIELD OF THE INVENTION

The present invention relates to temperature tracking defect correction apparatus for solid-state imagers which include defective photosensitive elements.

BACKGROUND OF THE INVENTION

Solid-state imagers are finding increased use in cameras for detecting radiant energy in the visible and infrared light range due to their long life, low power consumption and small size, as compared with conventional image pick-up tubes. Solid-state imagers include an imaging area comprising an array of discrete photosensitive picture elements (pixels) for responding to light from a scene. Typically, solid-state imagers which are suitable for use in television cameras, such as the x-y addressed MOS field-effect transistor type or the self-scanned CTD (charge transfer device) type, have up to 200,000 pixels. Because of random non-uniformities in semiconductor substrate material from which the solid-state imagers are fabricated, and impurities and/or imperfections introduced during the manufacturing process, the manufacturing yield of solid-state imagers having acceptable imaging response characteristics for each pixel decreases substantially as the number of pixels in the imager increases. For example, one type of imaging response characteristic for a solid-state imager is dark current response. It is well known that semiconductor devices exhibit a certain amount of leakage current. In a solid-state imager, the leakage current may result in the collection of a charge in a pixel even in the absence of photo-excitation and is known as the dark current response. When solid-state imagers are used in television cameras, the dark current (nonimage-representative) response of each pixel must be relatively low as compared to its image-representative photoresponse so as to allow television signals to be generated with an acceptable signal-to-noise ratio. However, if the dark current response for a particular pixel is higher than the average level of its surrounding pixels, it will show up as a "white spot" defect in the generated television signal. Alternatively, a pixel can cause a "black spot" defect in a television signal as a result of impurities and/or imperfections introduced during the manufacturing process of the imager. Because of defects like these, the manufacturing yield of solid-state imagers having a large number of pixels, such as those suitable for television cameras, is quite low. Thus, each imager must be carefully tested to screen out those with defects and a high cost is associated with the relatively few imagers which are found to be acceptable.

One way of using such imperfect imagers in a television camera, thereby increasing the number of usable imagers and consequently lowering their cost, is to include a defect corrector in the camera. For example, U.S. Pat. No. 4,179,711, filed in the name of Nagumo, shows a camera wherein a CCD (charge coupled device) imager and a frame memory loaded with defect location information are synchronously clocked. When the defect location memory indicates a signal from a defective pixel is being supplied by the CCD, the signal from a prior pixel is substituted in its place. This type of correction, commonly called "substitution", is generally not desirable for use in television cameras because the substituted signal is clearly visible as being erroneous when viewing a test pattern or a scene having fine detail. Additionally, a large memory is required to store the address of each pixel for identifying which ones are defective, thereby increasing the size, cost and power consumption of the defect corrector.

U.S. Pat. No. 4,200,934, filed in the name of Hofmann, is illustrative of another type of image defect corrector and includes a frame memory for storing the amplitude of the dark current for each pixel of the solid-state imager. The imager and frame memory are then synchronously clocked and dark current amplitudes stored in the frame memory are subtracted from the signals supplied by respective pixels of the imager. This results in an image-representative signal which is substantially free from nonimage dark current variations, as long as each stored dark current amplitude is smaller than the highest possible variation signal for the respective pixel and sufficient signal capacity (headroom) is left for accurately responding to the incident light. This system is advantageous over the substitution method since the correction can be virtually undetectable in a displayed image.

It is known that the amplitude of dark current signals change in accordance with changes in the temperature of the semiconductor material. For example, in CCD imagers dark current amplitudes approximately double for each $+8°$ C. rise in imager temperature. Thus, in the above-described subtraction type defect correction, the temperature of the imager may change between the time when the dark current signals are stored in the memory and the subsequent readout of those signals, leading to inaccurate defect correction.

SUMMARY OF THE INVENTION

In accordance with the principles of the invention, in a defect corrector for a solid-state imager, temperature tracking defect correction signals associated with the defective pixels are generated. These defect correction signals are combined with the photoresponse signals from the corresponding defective pixels so as to provide a temperature compensated defect corrected photoresponse signal for each defective pixel.

DESCRIPTION OF THE PREFERRED EMBODIMENTS

Figure 1:
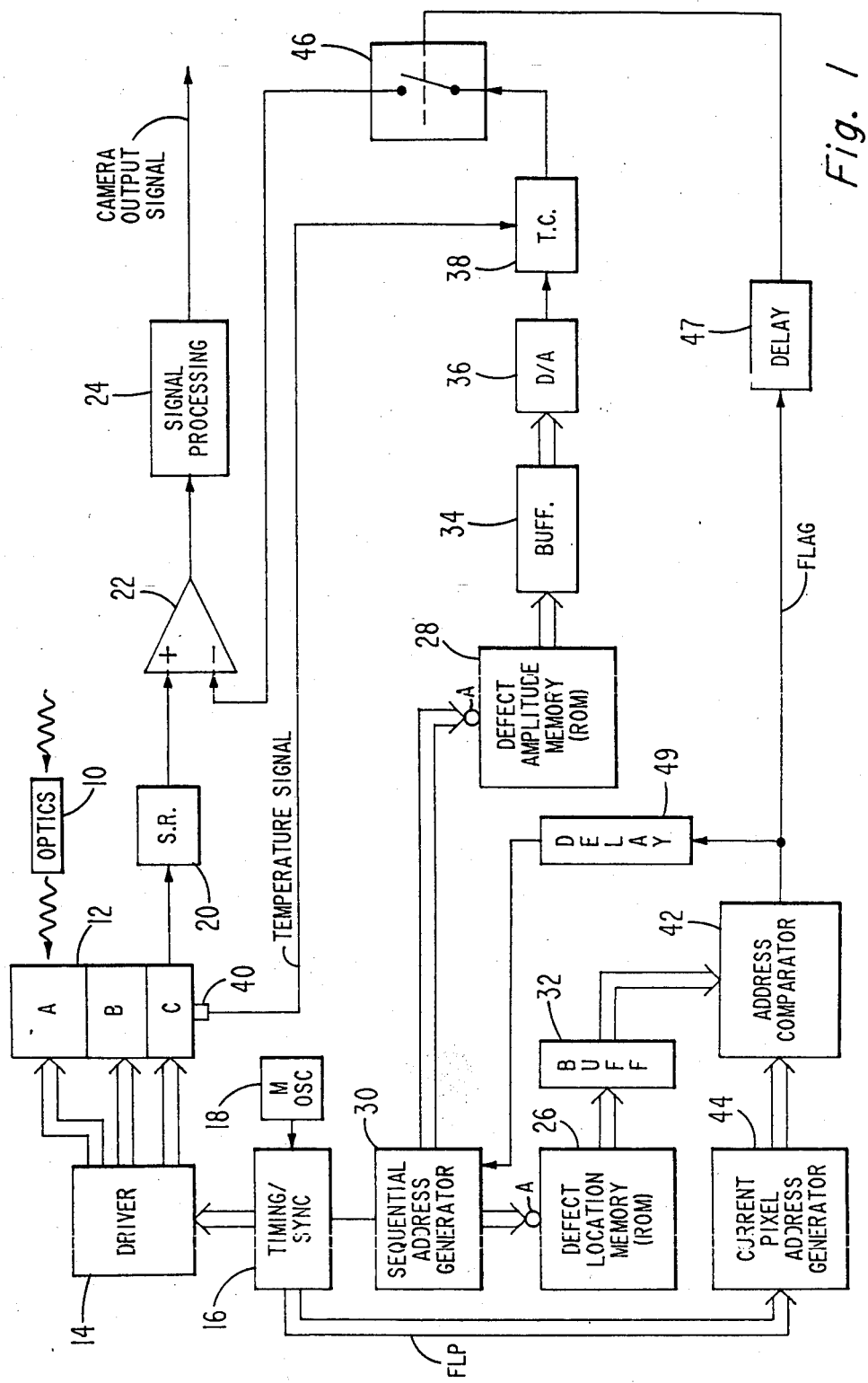
FIG. 1 illustrates, in block diagram form, a television camera including a temperature tracking defect corrector for a solid-state imager, constructed in accordance with the invention.

In the camera of FIG. 1, optics 10 directs light, illustrated by a wavy arrow, from a scene onto the photosensitive imaging area of a solid-state imager 12. Imager 12 may comprise any one of several commonly used solid-state imaging devices, such as an x-y addressed MOS imager or a self-scanned CTD (charge transfer device) imager. In the illustrated embodiment, imager 12 comprises a frame transfer CCD (charge coupled device) imager, such as the SID504 frame transfer CCD imager available from RCA Corporation. Briefly, a frame transfer CCD imager comprises a semiconductor substrate including a plurality of electrodes disposed over a substrate insulating layer and selectively doped regions for forming an imaging area (A register) including an array of photosensitive picture elements (pixels) for developing a charge pattern in response to incident light from the scene, a charge transfer area (B register) masked from incident light for storing the charge pattern developed in the A register, and a readout area (C register) for reading out electrical signals corresponding to the developed charge pattern. A driver stage 14, including level shifting and amplifying stages as well known, supplies level shifted and amplified versions of multiphase clock signals developed by a timing and synchronization (sync) circuit 16 in response to pulses from a master oscillator 18 to the electrodes in the A, B and C registers of imager 12. The construction and operation of CCD imagers is well known to those skilled in the art, therefore, further detailed description of imager 12 is unnecessary.

The electrical signal produced at the output of the C register supplies an imager output signal to a signal recovery circuit 20, which may comprise, for example, a well known correlated double-sampling circuit. The signal from signal recovery circuit 20 is supplied to the noninverting (+) signal input of a differential amplifier 22. As will be described in greater detail below, if a particular pixel is defective, a defect correction signal having an amplitude which is adjusted in accordance with the temperature of imager 12 is supplied to the inverting (−) signal input of amplifier 22 during the time period in which the electrical signal at the noninverting (+) signal input of amplifier 22 corresponds to the defective pixel. A defect-corrected signal is produced at the output of amplifier 22 and processed by signal processing circuits 24, which may include gamma correction, white and black balance and synchronization signal insertion, etc. for developing a conventional television signal. Since the amplitude of the correction signals are adjusted in response to imager temperature, the defect correction can be extremely accurate. Furthermore, since only the correction signals for defective pixels need be generated, significant savings are realized in the amount of circuitry and power consumption required for the defect corrector, as will become clear from the description below.

More specifically, the present defect corrector includes a defect location memory 26 including a non-volatile ROM (read only memory) having stored therein address information for identifying the location of each of the defective pixels to be corrected. The address information may comprise a block of bits. By way of example, the block may include 18 bits, the first bit indicates if the television field including the defect is odd or even, the next eight bits indicate the television line the defect is located in (eight bits are enough to specify up to 255 lines, which is sufficient for the 242 active television lines per field in the NTSC television system) and the last nine bits indicate the horizontal position of the defect along the television line (nine bits can specify up to 511 positions, which is sufficient for 403 pixels per line such as provided by the RCA SID504 CCD imager). A defect amplitude memory 28 also includes a non-volatile ROM, having stored therein a block of information relating to the defect amplitude level for each defective pixel to be corrected. For example, if the defect to be corrected is a white spot defect, the amplitude level of that portion of the dark current for the defective pixel which is greater than (i.e., exceeds the reference level of) the average pixel dark current of its neighbors, is stored in memory 28 in a block of locations (6 bits is sufficient) as a defect correction signal for that defective pixel.

A sequential address generator 30 provides addressing signals to defect location memory 26 and defect amplitude memory 28. For each address represented by the addressing signals, an 18-bit defect address is read out of defect location memory 26 and stored in a buffer register 32 and a corresponding 6-bit defect correction signal is read out of defect amplitude memory 28 and stored in a buffer register 32. Each time the camera is turned on, timing and sync circuit 16 provides a frame-rate signal to sequential address generator 30 which causes it to provide addressing signals to memories 26 and 28 for reading out their first block of information relating to the first pixel defect of the television frame to be corrected. The digital defect correction signal stored in buffer register 34 is converted by a digital-to-analog (D/A) converter 36 into a corresponding analog defect correction signal. As previously noted, dark current levels vary with temperature. Therefore, a temperature compensation stage 38 modifies the amplitude level of the defect correction signal generated by D/A converter 36 in accordance with a temperature representative signal developed by a temperature sensor 40 in thermal contact with imager 12. Temperature compensation stage 38 may comprise, for example, a gain controlled amplifier using the temperature signal as its gain control signal.

An address comparator 42 receives the defect address from buffer register 32 at one of its input ports and receives at its other input port addressing signals from a current pixel address generator 44 which represent the address of the pixel currently being read out from imager 12. Current pixel address generator 44 includes field rate (F), line rate (L) and pixel-rate (P) counters responsive to F, L and P signals provided by timing and sync circuit 16 for generating the current pixel address, as well known by those skilled in television circuitry. When the current pixel address coincides with the defect address stored in buffer register 32, a flag signal is generated at the output of comparator 42. In response to the flag signal, a gate 46 is caused to couple the temperature tracking defect correction signal to the inverting (−) input of amplifier 22 during the time period when the signal derived from the first defective pixel is being coupled to the noninverting (+) input of amplifier 22. Amplifier 22 subtracts the defect correction signal from the imager supplied signal derived from the first defective pixel, resulting in a signal supplied to camera signal processing circuits 24 which corresponds substantially to only the image-representative photoresponse for the defective pixel. Signal processing circuit 24 may also include a sampling circuit at its input for resampling the defect corrected signal so as to eliminate switching signal transients at pixel edges caused by gate 46, as is well known. The flag signal is also applied to sequential address generator 30 for causing it to supply new addressing signals to memories 26 and 28, thereby causing the next defect address and defect correction signal for the next defective pixel to be loaded into buffers 32 and 34, respectively, after the completion of the defect correction for the prior pixel. Depending upon the actual construction of the defect correction apparatus, it may be found necessary to delay the application of the flag signal to gate 46 and sequential address generator 30 via delays 47 and 49, respectively, in order that the timing of the above-described operation occurs properly.

It has been noted by the inventor that of the imager pixels having excessive (defective) dark current levels, but correctable using the apparatus of FIG. 1, different pixels may exhibit different temperature versus amplitude characteristics. These different temperature characteristics may result, for example, from differences in the depth within the imager semiconductor material that the defect is located. Furthermore, it has been observed by the inventor that the amplitude of dark current defects originating in the A register have a temperature variation characteristic but that the amplitude of signal defects found to have originated in the B register have almost no temperature variation. Under these situations, the temperature compensation stage 38 of FIG. 1 may become very complex and it may be difficult to obtain accurate temperature tracking for all of the defective pixels, especially over a wide temperature range. Therefore, in accordance with a further aspect of the invention, a defect amplitude memory (28 shown in FIG. 2) has stored therein a plurality of defect correction signals for each pixel defect. Each stored defect correction signal for a given defective pixel is representative of an amplitude level for the dark current at a different imager temperature. During camera operation, the addressing of memory 28 is modified in accordance with the imager temperature signal so as to cause readout of a defect correction signal which most closely matches the amplitude of the dark current for the defective pixel according to the present temperature.

Figure 2:
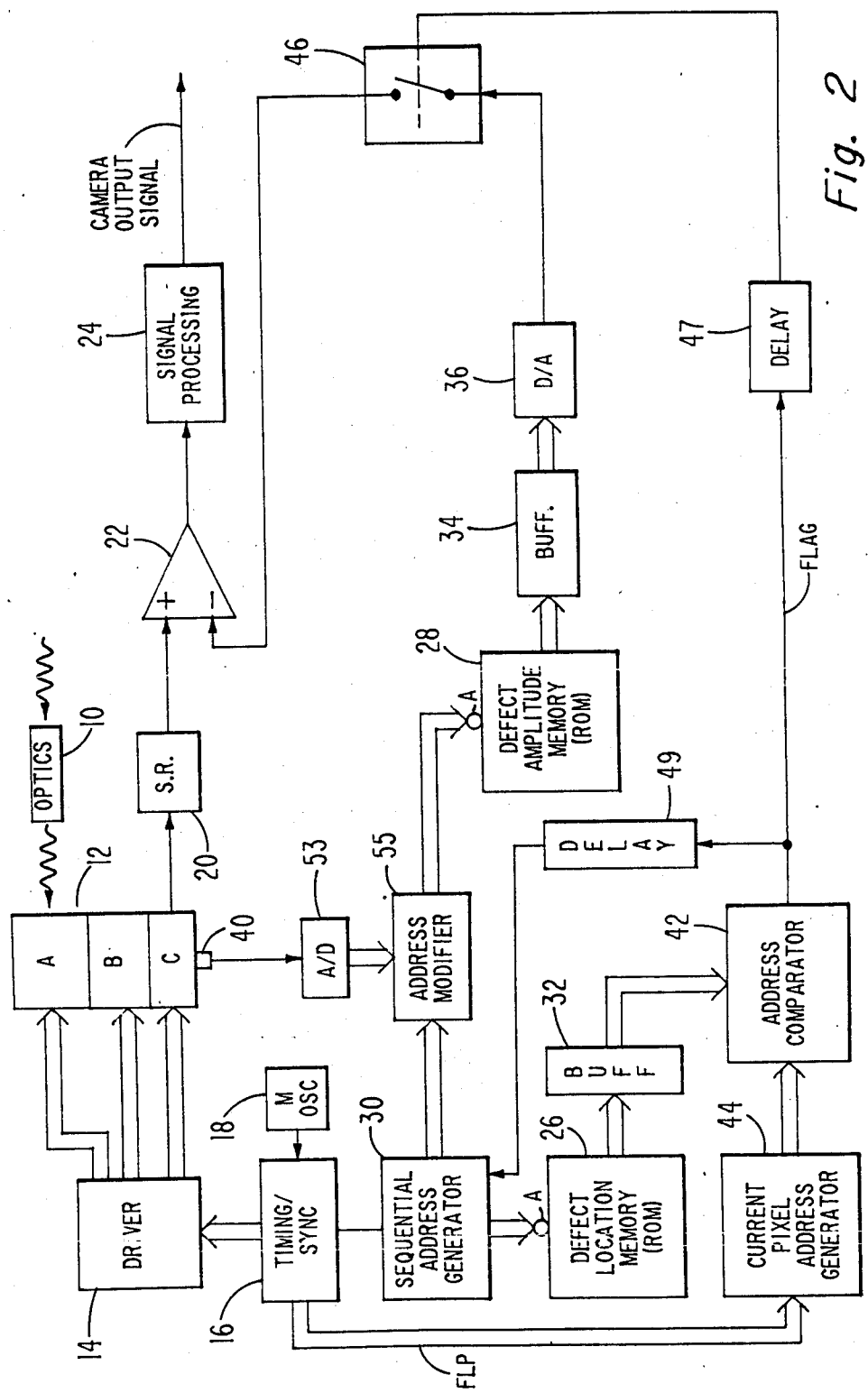
FIG. 2 illustrates, in block diagram form, an alternative embodiment of a defect corrector constructed in accordance with the principles of the invention.

FIG. 2 illustrates the above-noted alternative embodiment of the invention, wherein elements similar in construction and operation to those described with respect to FIG. 1 are identified by the same reference numerals. In FIG. 2 the temperature signal from temperature sensor 40 is digitized by an A/D converter 53 and applied to one input of an address modifier 55. The addressing signals from sequential address generator 30 are applied to the other input of address modifier 55. Address modifier 55 combines the digital signals at its input for generating a single address signal at its output which is applied to the A input of defect amplitude memory 28, wherein the addressing signals from sequential address generator 30 identify (address) a particular group of blocks of memory locations for selecting a given defective pixel and the signals from A/D converter 53 identify a particular block within the identified group of blocks which has stored therein the defect correction signal which most closely represents the defect correction signal amplitude at the present temperature of imager 12. Thus, defect amplitude memory 28 provides at its output defect correction signals which track the temperature changes of the imager and result in an accurate defect correction over a wide temperature range.

Prior to assembly of the camera, i.e., during camera manufacture, defect location memory 26 and defect amplitude memory 28 must be loaded with the defect address and defect amplitude information for the defective pixels. Specifically, in FIG. 3, wherein elements similar in construction and operation to those described with respect to FIGS. 1 and 2 are identified by the same reference number, apparatus for loading the defect address and defect amplitude information into memories 26 and 28 of the FIG. 1 embodiment is illustrated. Firstly, only imagers having defects which are suitable for use in conjunction with the FIGS. 1 and 2 defect correctors are used, e.g., if the defects are white spots, they are small enough that sufficient signal capacity (headroom) is available for accurately developing an image-representative photoresponse for each defective pixel. A mask 51 is positioned in front of the photosensitive A register of imager 12 so as to substantially block all light from reaching the photosensitive pixels, thereby enabling an operator to view e.g., dark current defects such as white spots on monitor 50. The video signal from signal processing circuits 24 is applied via a summer 48 to a monitor 50 where it is reproduced. The operator views monitor 50 while adjusting the position of a cursor generated by a cursor and address generator 52 until the position of the cursor is aligned on monitor 50 with a defective pixel. Once aligned, the operator depresses a switch 54 which causes loading of the 18-bit address for the defective pixel, as identified by the curser and address generator 52, into the ROM of memory 26 and loads into the ROM of memory 28 the 6-bit digital correction signal which is generated by a defect correction signal generator 56. This process is repeated until defect address and correction signals are sequentially stored in memories 26 and 28, respectively, for each defect to be corrected.

More specifically, cursor and address generator 52 includes counters responsive to the F, L and P signals for generating the cursor signal, which is added to the imager generated video signal via summer 48. Additionally, cursor and address generator 52 simultaneously generates an 18-bit address representative of the current cursor position which is applied to address comparator 42 and the data (D) input of defect location memory 26. After the operator adjusts horizontal (H) and vertical (V) controls associated with cursor and address generator 52 so as to position the cursor so that it is coincident with the first defect to be corrected, the 18-bit cursor address supplied to memory 26 corresponds to the 18-bit address of the defective pixel. Furthermore, comparator 42 compares the cursor address signal with the current pixel address from address generator 44 for generating a flag signal each time the addresses are coincident. The flag signal is applied to a sample-and-hold circuit 58 for sampling the dark current level of the defective pixel. The sampled level is applied to the noninverting (+) input of a differential amplifier 60. A lowpass filter 62 has a relatively long time constant (e.g., 30 pixels) for developing signal at its output representative of the average dark current of the neighboring pixels which precede the defective pixel. A sample-and-hold circuit 64, also responsive to the flag signal, samples the output of lowpass filter 62 and applies the average dark current signal as a reference level to the inverting (−) input of amplifier 60. The difference signal developed at the output of amplifier 60 corresponds to the defect correction signal and represents the deviation of the dark current for the defective pixel from the average dark current of its neighboring pixels. The defect correction signal is then digitized by an A/D converter 66 into a 6-bit digital signal which is applied to the D input of memory 28. Thus, after the operator has set the curser to be coincident with the first defect to be corrected, that portion of the FIG. 3 apparatus described so far supplies the defect address and defect correction signals for the first defect to be corrected to the D inputs of memories 26 and 28.

The sequential address generator 30 supplies to the address (A) inputs of memories 26 and 28 addressing signals for directing the 18-bit pixel address and 6-bit digital defect correction signal for the first defect into a first block of memory locations in memories 26 and 28. The operator then presses switch 54 which activates a one-shot 68 for generating a LOAD pulse which causes loading of the defect address and digital correction signals into the first block of locations in memories 26 and 28 which are addressed by sequential address generator 30. A delay 70 applies the LOAD signal to sequential address generator 30 for incrementing its addressing signals after completion of the loading of memories 26 and 28, so that new addressing signals are applied to memories 26 and 28 which are representative of the address for the next block of information for the next defect to be corrected. The operator repeats this procedure until defect address and correction information are stored in memories 26 and 28 for each of the defects to be corrected.

Figure 3:
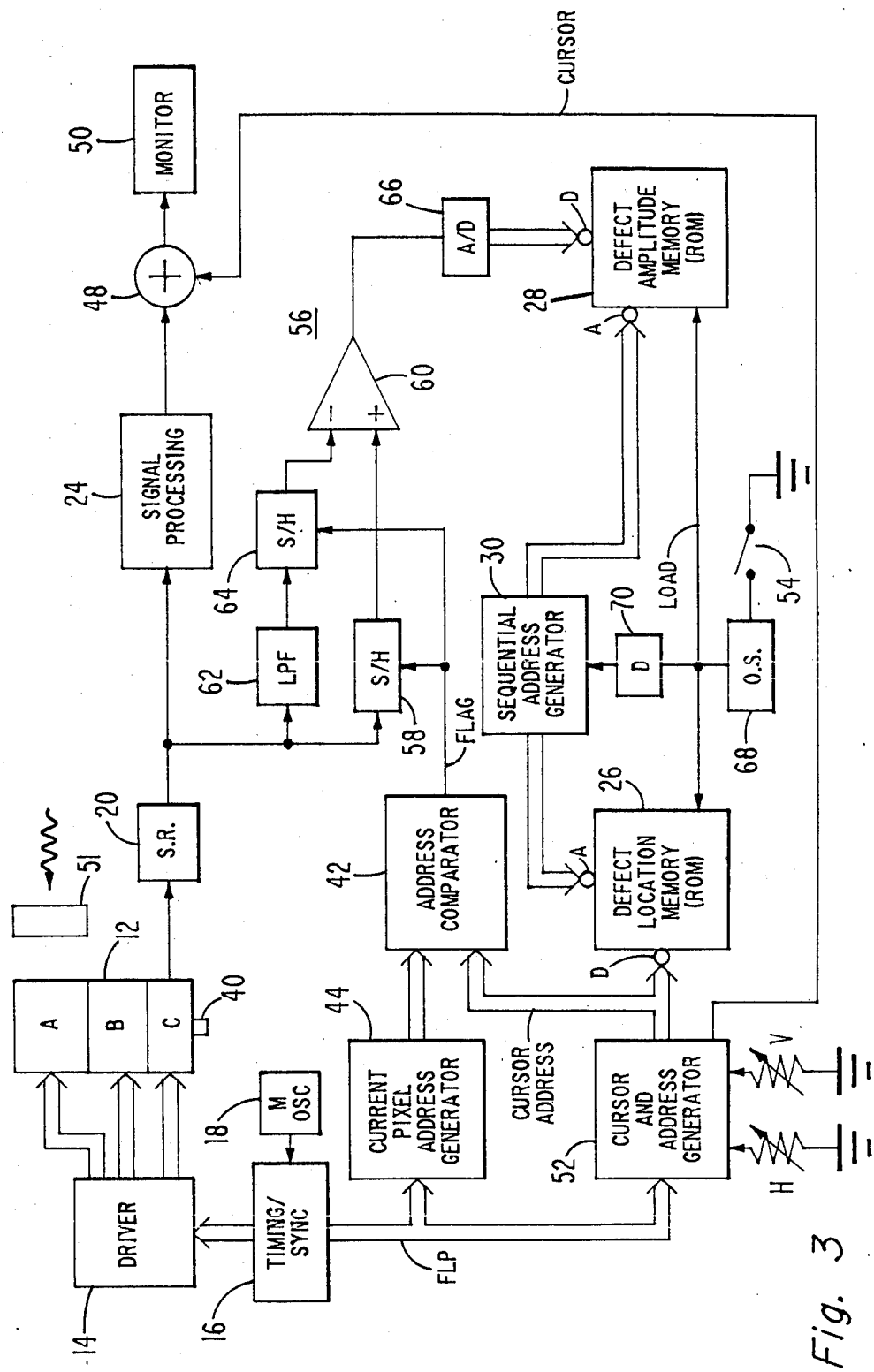
FIG. 3 illustrates, in block diagram form, apparatus for determining the location and amplitude level of defects in a solid-state imager which may be used in conjunction with the defect corrector shown in FIGS. 1 and 2.
Figure 4:
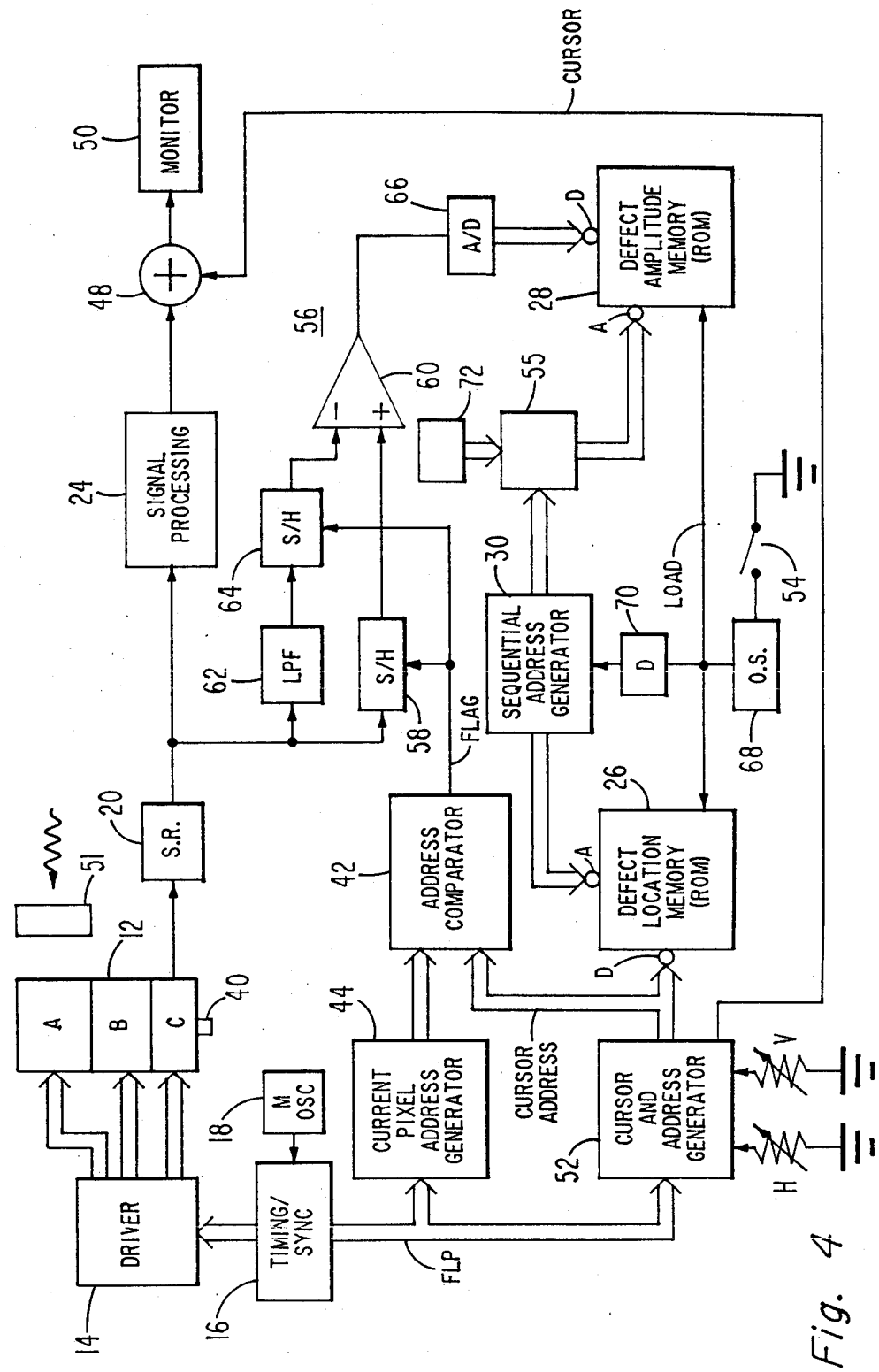
FIG. 4 illustrates, in block diagram form, apparatus for determining the location and amplitude level of defects in a solid-state imager which may be used in conjunction with the defect corrector shown in FIG. 2.

FIG. 4 illustrates apparatus for loading into defect amplitude memory 28 signals representative of a plurality of defect amplitudes for each pixel defect to be corrected, in accordance with the FIG. 3 embodiment of the invention. Elements similar in construction and operation to those described with respect to FIGS. 2 and 3 are identified by the same reference number. First, imager 12 and its associated mask 51 are placed in a temperature-controlled chamber (not shown) and imager 12 is brought to a given temperature within the desired operating range of the defect corrector, e.g., 0° C. of a 0° C.–50° C. temperature range. The operator then adjusts curser and address generator 52 so that the curser is aligned with the first defect to be corrected and adjusts a control stage 72 which supplies addressing signals to address modifier 55 until the address provided at the output of modifier 55 corresponds to the address it would provide for the first pixel defect in the FIG. 3 embodiment if the temperature of imager 12 were 0° C. Memories 26 and 28 are then loaded with defect location and correction signals for each defective pixel in a manner such as described with respect to FIG. 3. When completed, the operator readjusts the temperature-controlled chamber to, e.g., 2° C., readjusts control 72 so that the address provided by modifier 55 is that which it would provide for the first pixel defect in the FIG. 3 embodiment if the temperature of imager 12 were 2° C. Memory 28 is then loaded with defect-correction signals corresponding to the 2° C. temperature. The above process is repeated until 25 defect amplitudes are stored for each defective pixel, i.e., one for each 2° C. over the entire 50° C. temperature range. In an alternative embodiment, after defect location memory 26 is loaded with location information the first time, i.e., at 0° C., cursor and address generator 52 and be replaced by location memory 26 so that pixel addresses for loading memory 28 could be automatically generated.

What is claimed is:

1. Imaging apparatus, comprising:
   solid-state imaging means including an array of photosensitive elements for providing an image-representative signal including nonimage-representative signal components corresponding to ones of said photosensitive elements, said nonimage-representative components having temperature dependent amplitude levels;
   means for providing a temperature signal representative of the present temperature of said solid-state imaging means;
   means responsive to said temperature signal for sequentially providing a plurality of temperature dependent correction signals corresponding to said ones of said photosensitive elements, said temperature dependent correction signals having amplitudes which track the amplitude of respective ones of said temperature dependent nonimage-representative signal components; and
   means for combining respective ones of said correction signals with said image-representative signal so as to provide cancellation of said temperature dependent nonimage-representative components of said image-representative signal.

2. Apparatus according to claim 1 wherein:
   each one of said nonimage-representative signal components has an amplitude level which deviates by a given amount from a reference amplitude level; and
   each one of said plurality of correction signals has an amplitude level representative of said deviation.

3. Apparatus according to claim 2 wherein:
   said nonimage-representative signal component comprises dark current response; and
   said reference level corresponds to an average dark current response of said photosensitive elements of said array.

4. Apparatus according to claim 1 wherein said means for sequentially providing temperature dependent correction signals comprises:
   means for sequentially generating a plurality of temperature independent correction signals having amplitudes related to the amplitudes of respective ones of said nonimage-representative signal components at a given temperature; and
   means coupled between said generating means and said summing means for modifying the amplitude of said temperature independent correction signals in response to said temperature signal.

5. Apparatus according to claim 1 wherein said means for sequentially providing temperature dependent correction signals comprises:
   memory means for storing in digital form a plurality of defect signals at predetermined addressable locations for each one of said ones of said photosensitive elements, said defect signals having amplitude levels which correspond to the amplitude levels of respective ones of said nonimage-representative signal components at respective temperatures; and
   addressing means for addressing said memory means to read out said defect signals in response to the generation of said nonimage-representative components by said imaging means and said temperature signal.

6. Imaging apparatus, comprising:
   solid-state imaging means including an array of photosensitive elements for providing an image-representative signal including nonimage-representative signal components corresponding to ones of said photosensitive elements, said nonimage-representative components having temperature dependent amplitude levels;

means for providing a temperature signal representative of the present temperature of said solid-state imaging means;

means for sequentially generating a plurality of temperature independent correction signals having amplitudes related to the amplitudes of respective ones of said nonimage-representative signal components at a given temperature;

means coupled to the output of said generating means for modifying the amplitude of said temperature independent correction signals in response to said temperature signal; and means for summing respective ones of said modified correction signals with said image-respective signals so as to provide cancellation of said temperature dependent nonimage-representative components of said image-representative signal.

7. Imaging apparatus, comprising:

solid-state imaging means including an array of photosensitive elements for providing an image-representative signal including nonimage-representative signal components corresponding to ones of said photosensitive elements, said nonimage-representative components having temperature dependent amplitude levels;

means for providing a temperature signal representative of the present temperature of said solid-state imaging means;

memory means for storing in digital form a plurality of defect correction signals at predetermined addressable locations for each one of said ones of said photosensitive elements, said defect correction signals having amplitude levels which correspond to the amplitude levels of respective ones of said nonimage-representative signal components at respective temperatures;

addressing means for addressing said memory means to read out said defect correction signals in response to the generation of said nonimage-representative components by said imaging means and said temperature signal; and means for summing respective ones of said defect correction signals with said image-representative signal so as to provide cancellation of said temperature dependent nonimage-representative components of said image-representative signal.

* * * * *